United States Patent
Tsai (10) Patent No.: US 8,332,623 B2
(45) Date of Patent: Dec. 11, 2012

(54) EMBEDDED ELECTRONIC DEVICE AND BOOTING METHOD THEREOF

(75) Inventor: Hsien-Ming Tsai, Hsinchu Hsien (TW)

(73) Assignee: Mstar Semiconducr, Inc., Hsinchu Hsien (TW)

( * ) Notice: Subject to any disclaimer, the term of this patent is extended or adjusted under 35 U.S.C. 154(b) by 614 days.

(21) Appl. No.: 12/472,755

(22) Filed: May 27, 2009

(65) Prior Publication Data
US 2010/0070749 A1    Mar. 18, 2010

(30) Foreign Application Priority Data
Sep. 15, 2008    (TW) .............................. 97135388 A (51) Int. Cl.
*G06F 9/00* (2006.01)
(52) U.S. Cl. ................................................ 713/2
(58) Field of Classification Search ............ 713/2
See application file for complete search history.

(56) References Cited

U.S. PATENT DOCUMENTS

| | | | |
|---|---|---|---|
| 5,860,001 A * | 1/1999 | Cromer et al. ............. | 713/1 |
| 6,446,203 B1 * | 9/2002 | Aguilar et al. ............. | 713/2 |
| 6,980,239 B1 * | 12/2005 | Motta ............. | 348/211.6 |
| 7,231,515 B2 * | 6/2007 | Taylor ............. | 713/2 |
| 7,464,259 B2 * | 12/2008 | Sukegawa et al. ......... | 713/2 |

* cited by examiner

Primary Examiner — Kim Huynh
Assistant Examiner — Eric Chang
(74) Attorney, Agent, or Firm — WPAT PC; Justin King (57) ABSTRACT

An embedded electronic device and a booting method thereof are provided. The embedded electronic device, for downloading an initiation image from one of a plurality of initiation image source devices according to at least one option pin, comprises a boot memory, for storing a boot code and a plurality of initiation image source sequence tables; a microprocessor, for executing the boot code and downloading the initiation image according to one of the initiation image source sequence tables; a register, for storing a status of the at least one option pin; and a bus, coupled to the boot memory, the microprocessor and the register, for transmitting data between the boot memory, the microprocessor and the register; wherein the initiation image source sequence table is selected according to the status stored in the register, and the sequence of the initiation image source devices accessed by the microprocessor is determined according to the initiation image source sequence table.

11 Claims, 7 Drawing Sheets

EMBEDDED ELECTRONIC DEVICE AND BOOTING METHOD THEREOF

CROSS REFERENCE TO RELATED PATENT APPLICATION

This patent application is based on a Taiwan, R.O.C. patent application No. 97135388 filed on Sep. 15, 2008.

FIELD OF THE INVENTION

The present invention relates to an embedded electronic device and a booting method thereof, and more particularly, to an embedded electronic device having various optional sequences of accessing initiation image source devices and a booting method thereof.

BACKGROUND OF THE INVENTION

Nowadays as science and technology are changing with each passing day, embedded electronic devices, such as mobile phones, personal digital assistants (PDA), portable navigation devices (PND) and so on, have become indispensable electronic products in the daily life of modern people. During booting of an embedded electronic device, a microprocessor executes a boot code stored in a boot memory. The microprocessor then accesses an initiation image from a fixed initiation image source device according to the boot code, and executes the initiation code in the initiation image to initiate the embedded electronic device. A conventional boot memory, for storing the boot code, is an access only memory (ROM) or a NOR flash memory. Content of the ROM is not easy to modify, and hence it is rather inconvenient to modify the boot code for changing the initiation image source device.

In addition, option pins are also applied for selecting a boot memory or an initiation image source device in an embedded electronic device. When the embedded electronic device has more than two types of boot memories, such as a ROM or a NOR flash memory, the option pins are used to select a boot code from the ROM and the NOR flash memory. Furthermore, when the embedded electronic device simultaneously has various types of initiation image source devices, such as a NAND flash memory, a hard disk (HD), a universal asynchronous receiver/transmitter (UART), a universal serial bus (USB) and so on, option pins are used to select one of different initiation image source devices and its configuration to provide the initiation image to the microprocessor for initiating the embedded electronic device.

When the embedded electronic device has a plurality of initiation image source devices and partial initiation image source devices have different configurations, a conventional booting method generally uses N option pins to select one initiation image source device from $2^N$ initiation image source devices, where N is greater than 1. However, the conventional method tends to excessively use option pins that lead to an increase in the volume of the embedded electronic device. Moreover, when the selected initiation image source device, such as a Secure Digital (SD) card, does not connect to the embedded electronic device, or have any malfunctions, booting of the embedded electronic device may fail.

During booting of a personal computer (PC) or a notebook (NB) computer, a microprocessor accesses a booting sequence table in a basic input and output (BIOS) system. The booting sequence table determines in accessing an operation system for booting the PC or NB computer from devices, such as an HD, a floppy disk or a compact disk (CD). A user selects from a menu via a keyboard or a screen, so as to change a setting of the boot sequence table, of the BIOS, stored in a complementary metal-oxide semiconductor (CMOS) memory. With respect to an embedded electronic device, cost is increased when the CMOS memory is added, let alone that an additional power supply needs to be provided to the CMOS memory when the embedded electronic device is switched off. In addition, the setting of the BIOS is achieved via the keyboard or the screen, which is not necessarily equipped in the embedded electronic device.

Therefore, according to the present invention, an embedded electronic device and a booting method thereof are disclosed to provide various optional initiation image sources and sequences for booting up the embedded electronic device.

SUMMARY OF THE INVENTION

The present invention relates to an embedded electronic device and a booting method thereof for providing various optional initiation image sources and sequences for booting the embedded electronic device.

The present invention relates to an embedded electronic device and a booting method thereof, which are capable of changing potential of option pins to select another boot sequence. Wherein, the potential of the option pins are associated with existence of a certain initiation image source device. According to the present invention, an embedded electronic device downloading initiation images in sequence from a plurality of initiation image source devices according to at least one option pin is provided. The embedded electronic device, for downloading an initiation image from one of a plurality of initiation image source devices according to at least one option pin, comprises a boot memory, for storing a boot code and a plurality of initiation image source sequence tables; a microprocessor, for executing the boot code and downloading the initiation image according to one of the initiation image source sequence tables; a register, for storing a status of the at least one option pin; and a bus, coupled to the boot memory, the microprocessor and the register, for transmitting data between the boot memory, the microprocessor and the register; wherein the initiation image source sequence table is selected according to the status stored in the register, and the sequence of the initiation image source devices accessed by the microprocessor is determined according to the initiation image source sequence table.

According to the present invention, an embedded electronic device, for downloading an initiation image from an initiation image source device according to a option pin. The embedded electronic device, for downloading an initiation image from an initiation image source device according to an option pin, comprises a boot memory, for storing a boot code; a microprocessor, for executing the boot code and downloading the initiation image from the initiation image source device; a register, for storing a status of the option pin; a control interface, connected to the initiation image source device and the option pin, for setting the status of the option pin and accessing the initiation image from the initiation image source device by the microprocessor; and a bus, coupled to the boot memory, the microprocessor, the register, and the control interface, for providing data transmission between the boot memory, the microprocessor, the register and the control interface; wherein the microprocessor downloads the initiation image from an initiation image source device when the initiation image source device is connected to the control interface.

A booting method of an embedded electronic device is provided according to the present invention. A booting method for an embedded electronic device comprising a boot memory and a register, the booting method comprises executing a boot code stored in the boot memory; accessing the register; accessing an initiation image source sequence table according to the register; and downloading an initiation image from an initiation image source device according to the initiation image source sequence table; wherein the initiation image source sequence table is used to select an initiation image source device by the microprocessor for downloading the initiation image.

Following description and figures are disclosed to better understand of the advantages of the present invention.

DETAILED DESCRIPTION OF THE PREFERRED EMBODIMENT

According to an embodiment of the present invention, during a booting procedure of an embedded electronic device, option pins are applied for selecting one of initiation image source sequence tables. An initiation image needed for booting up the embedded electronic device is downloaded from one of initiation image source devices, according to the selected initiation image source sequence table. The electronic device searches the initiation image in initiation image source devices according to the sequence of the selected initiation image until the initiation image is found in one of initiation image source devices. In addition, a specific option pin can be used directly to correspond to a certain initiation image source device, for detecting whether the initiation image source device exists.

Figure 1:
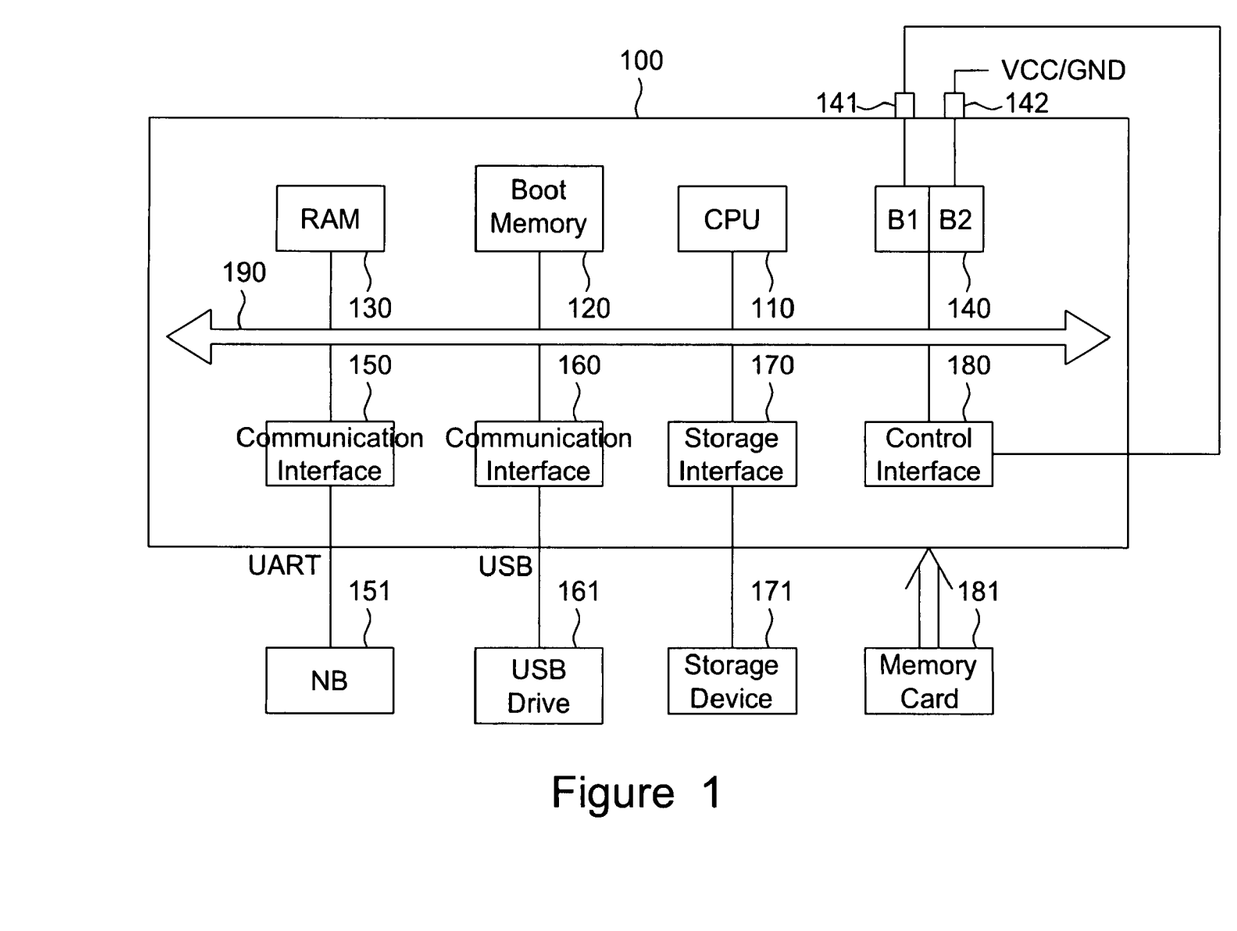
FIG. 1 is a functional block diagram of an embedded electronic device in accordance with an embodiment of the present invention.

FIG. 1 is a functional block diagram of an embedded electronic device according to an embodiment of the present invention. An embedded electronic device 100 at least comprises a microprocessor 110, a boot memory 120, a RAM 130, a register 140, option pins 141 and 142, a communication interface 150, a communication interface 160, a storage interface 170, a control interface 180 and a bus 190. Data and information transmission between the microprocessor 110, the boot memory 120, the RAM 130, the register 140, the option pins 141 and 142, the communication interface 150, the communication interface 160, the storage interface 170 and the control interface 180 are accomplished via the bus 190.

More specifically, the microprocessor 110 serves for execution of a booting procedure. The microprocessor 110 first accesses and executes a boot code stored in the boot memory 120, and then downloads initiation images into the RAM 130 from an initiation image source device, such as an NB computer 151, a USB drive 161, a storage device 171 or a memory card 181, according to an initiation image source sequence table corresponding to the register 140. The microprocessor 110 executes the initiation image to boot up the embedded electronic device. In this embodiment, the initiation image source devices connect to the bus 190 via a storage interface or a communication interface.

The boot memory 120 stores the boot code and a plurality of initiation image source device sequence tables. The boot code is executed by microprocessor 110 for the use of initialization elements, and the initiation image source device sequence tables correspond to bit values in the register 140, for determining the sequence of accessing the initiation image source devices. Content of initiation image source device sequence tables is to be described in conjunction with subsequent figures. Moreover, the boot memory 120 can be any suitable digital storage media, such as a ROM or NOR flash memory in this embodiment.

The RAM 130 stores the initiation image downloaded from the initiation image source device by the microprocessor 110.

The register 140 corresponds to the option pins 141 and 142; that is, a bit B1 and a bit B2 of the register 140 correspond to the option pins 141 and 142 respectively. For example, the option pin 141, connected to the control interface 180, detects whether the memory card 181 is being inserted into the embedded electronic device. When the memory card 181 is inserted into the control interface 180, the option pin 141 is logical low and hence the bit B1 of the register 140 is set as "0". When the memory card 181 is not inserted into the control interface 180, the option pin 141 is logical high and hence the bit B1 of the register 140 is set as "1". The option pin 142 is connected to a power VCC or ground (GND) according to system or user requirements. When the option pin 142 at logical high is connected to the power VCC, the bit B2 of the register 140 is set as "1". When the option pin 142 at logical low is connected to the GND, the bit B2 of the register 140 is set as "0". As mentioned above, the bit values of the register 140 is determined by the option pins according to system or user requirements, or according to connection conditions of external devices.

The microprocessor 110 accesses the initiation image stored in different initiation image source devices 151 to 181 via different interfaces 150 to 180. Referring to FIG. 1, the NB computer 151, the USB driver 161, the storage device 171 and the memory card 181 may serve as initiation image source devices, which likely store with the initiation image therein. The microprocessor 110 accesses the initiation image to boot up the embedded electronic device 100.

More specifically, in FIG. 1, the communication interface 150 is a UART interface, or the communication interface 160 is a USB interface. The initiation image source devices connect to the embedded electronic device 100 via the communication interfaces. However, it shall not be construed as limiting. Other types of communication interfaces can also be applied to the present invention, such as a Serial Peripheral Interface (SPI), an Inter-Integrated Circuit (12C), Ethernet Interface and so on.

The initiation image source devices can also connect to the embedded electronic device via a storage interface or a control interface, or the initiation image source devices are built inside the embedded electronic device. Referring to FIG. 1, the storage device 171 and the memory card 181 are different types of initiation image source device. The storage device 171 can be put inside or outside the embedded electronic device 100. The memory card 181 can be a Secure Digital (SD) card. Other types of storage devices, such an HD, a floppy disk, a CD, a flash memory, all types of storage cards like a MultiMedia Card (MMC), a xD-picture card, a Memory Stick, etc., can be applied to this embodiment.

Furthermore, partial initiation image source devices have different configurations, such as different address cycles of the memories. In this embodiment, the memories having different configurations are regarded as different initiation image source devices. Similarly, the UART interface has various communication rates, such as 9600 bps, 19200 bps . . . 115200 bps and so on. Hence, the devices, connecting to the UART interfaces with different communication rates and used as communication devices, are regarded as different initiation image source devices.

Figure 2:
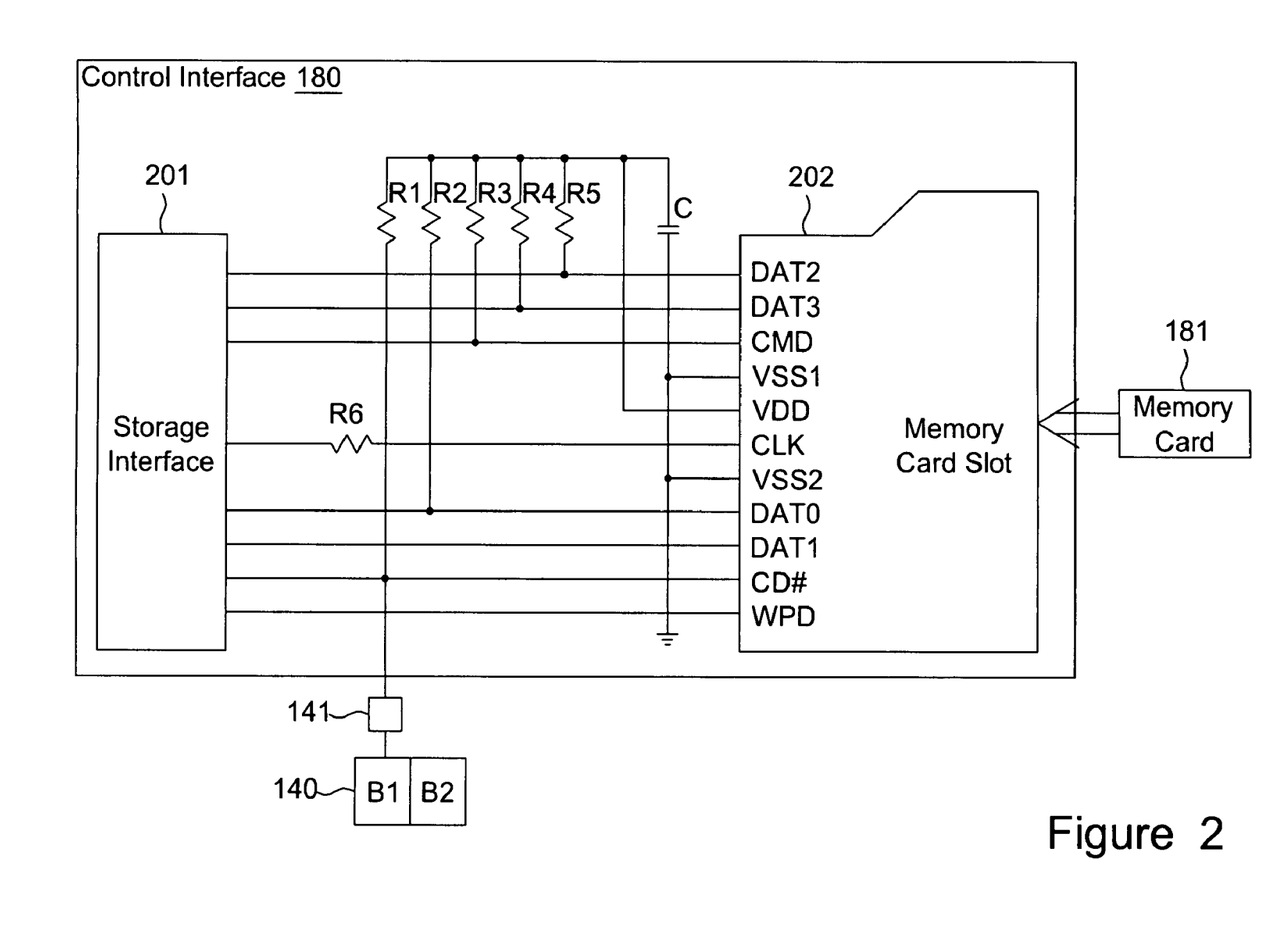
FIG. 2 is an example of a control interface according to an embodiment of the present invention.

FIG. 2 is an example of the control interface 180 in accordance with an embodiment of the present invention. The control interface 180 is an SD card control interface, comprising a storage interface 201, a memory card slot 202, a capacitor C and resistors R1 to R6. The input/output (I/O) pins of the memory slot 202 comprise data transmission pins DAT0-DAT3 for transmitting data, a power pin VDD connected to power, ground pins VSS1 and VSS2 connected to the ground, a command pin CMD for transmitting control signal receiving commands, a CLK pin for receiving system clocks, a detecting pin CD# for detecting whether the memory card 181 is inserted into the memory slot 202, and a WPD pin for providing a function of writing protection.

Referring to FIG. 2, the option pin 141 is coupled to the detecting pin CD#. When the memory card 181 is inserted into the memory slot 202, the option pin 141 is logical low, and hence the bit B1 of the register 140 is set as "0". When the memory card 181 is not inserted into the memory slot 202, the option pin 141 is logical high, and hence the bit B1 of the register 140 is set as "1". That is, the status of the option pin 141 is determined according to whether the memory card 181 exists or is connected to the embedded electronic device 180.

Figure 3:
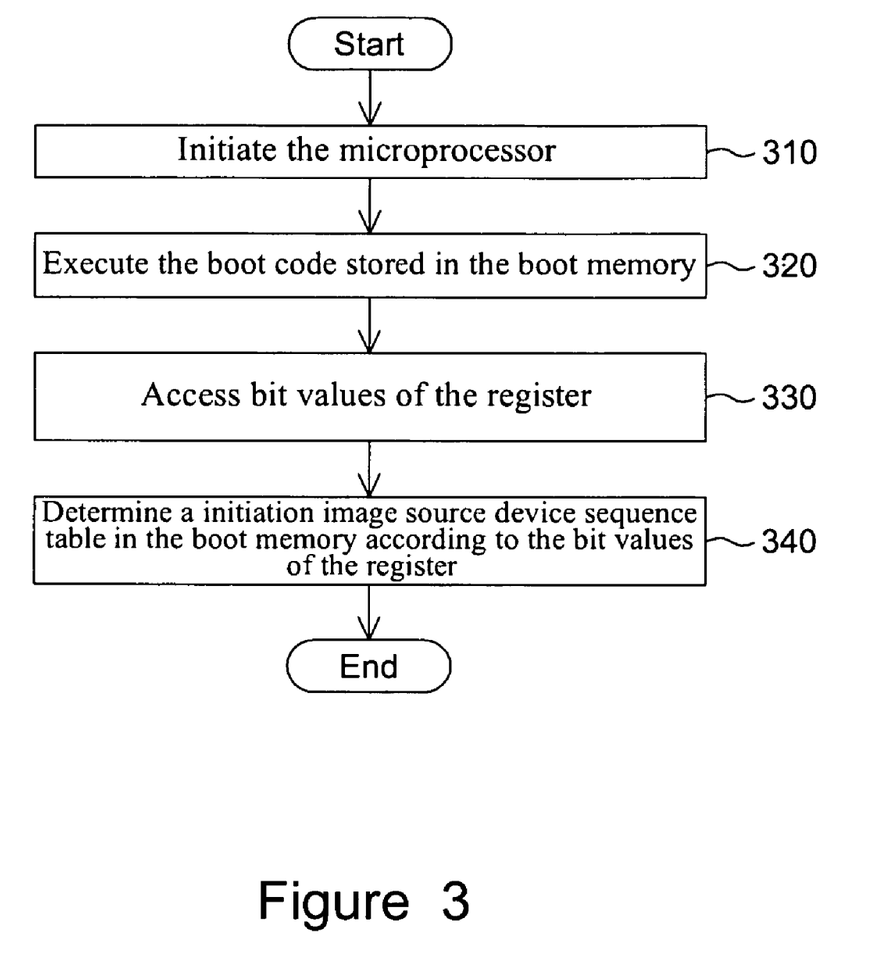
FIG. 3 is a booting flow according to an embodiment of the present invention.

FIG. 3 is a booting flow according to an embodiment of the present invention. In Step 310, the microprocessor 110 is initialized. In Step 320, the microprocessor 110 executes the boot code stored in the boot memory 120. In Step 330, the microprocessor 110 accesses bit values of the register 140. The setting values of the bits B1 and B2 of the register 140 correspond to the status of the option pins 141 and 142 as illustrated by Step 330 in FIG. 3. How to set the bits B1 and B2 is as described above, and the details shall not be discussed again for brevity. In Step 340, the microprocessor 110 determines to use one initiation image source device sequence table in the boot memory according to the bit values of the register 140, and checks whether the initiation image source devices contain a initiation image in sequence. When the initiation image is found, the microprocessor 110 downloads the initiation image into the RAM 130; otherwise, the microprocessor 110 checks a next initiation image source device according to the initiation image source device sequence table, and so on. The microprocessor 110 executes the downloaded initiation image in the RAM 130 to boot up the embedded electronic device.

In this embodiment, the register 140 has two bits B1 and B2, meaning that the boot memory 120 can store $4(=2^2)$ initiation image source device sequence tables. When the register 140 has k bits, the boot memory can store at most $2^k$ groups of initiation image device sequence tables.

Figure 4A:
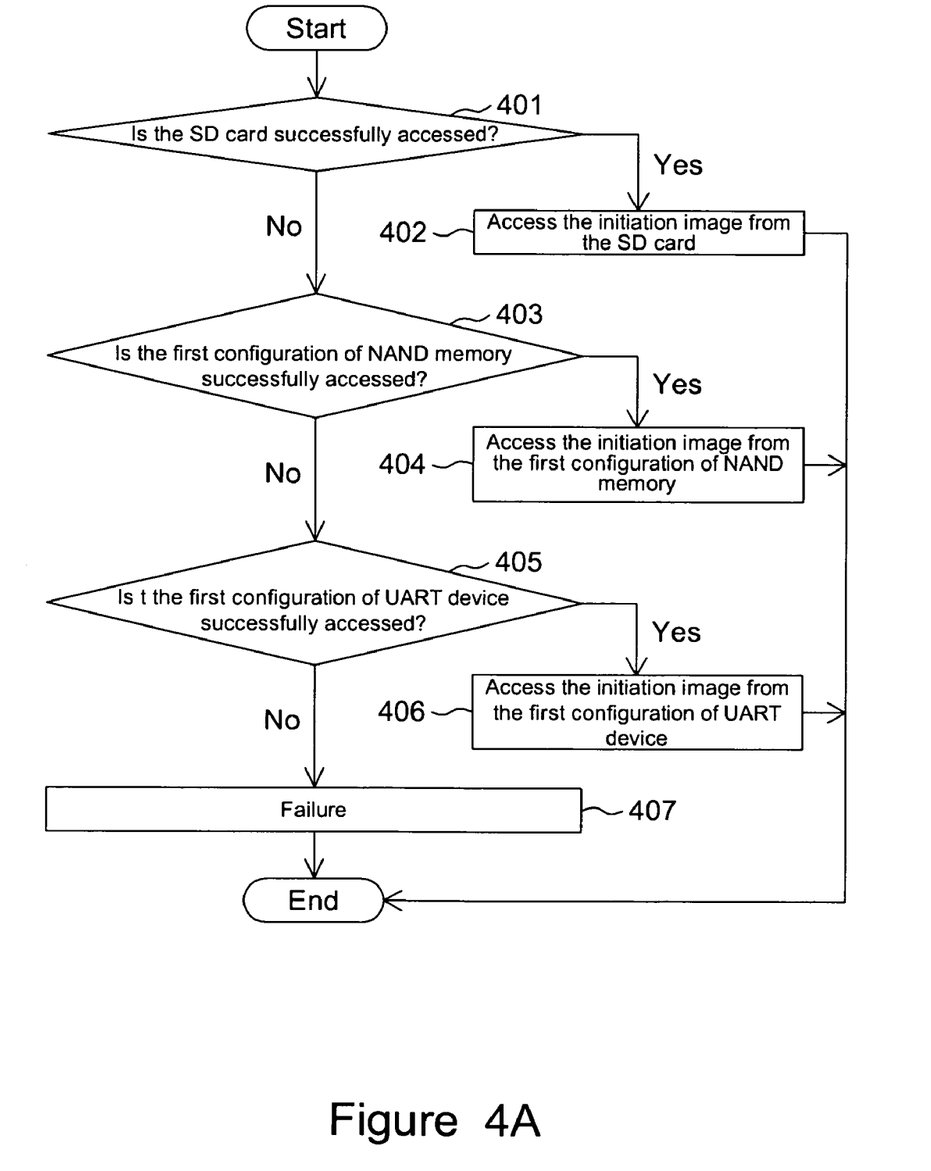
FIG. 4(a) to FIG. 4(d) illustrate various probable sequences of accessing initiation image source devices in accordance with an embodiment of the present invention.
Figure 4B:
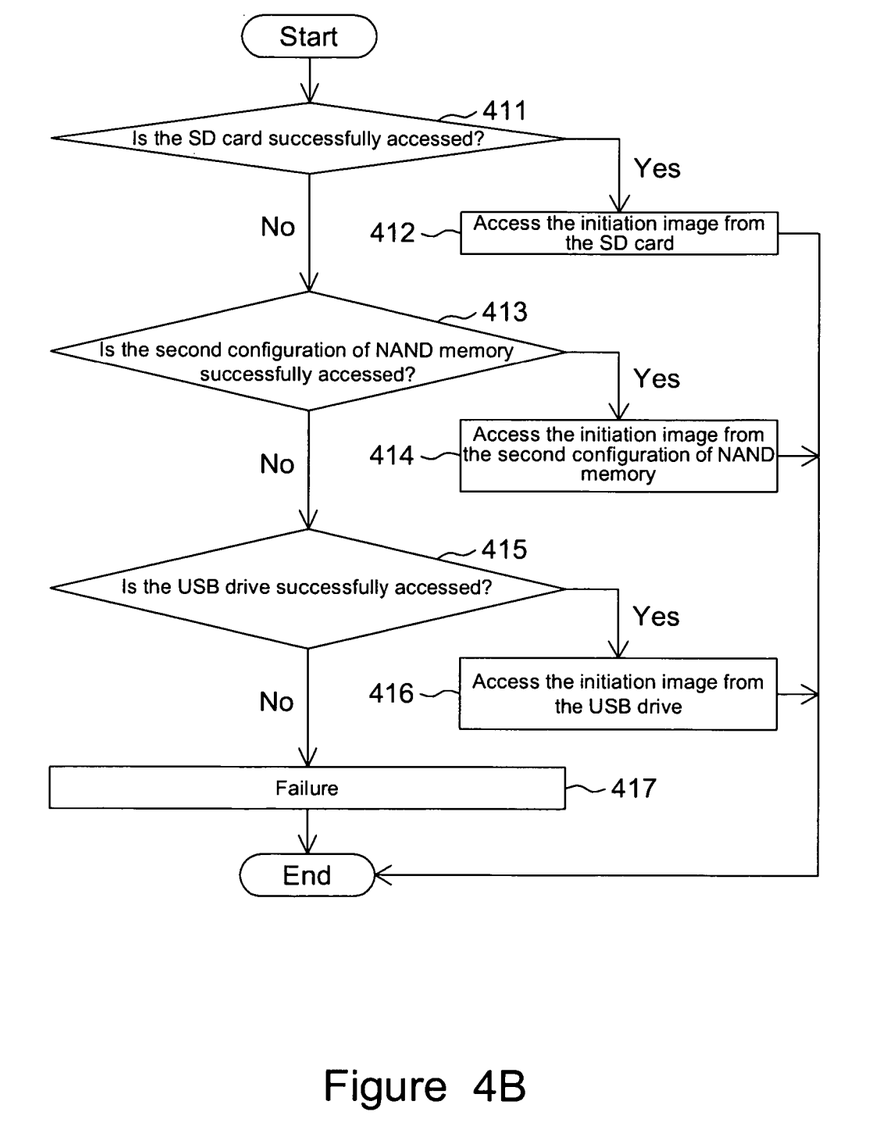
Figure 4C:
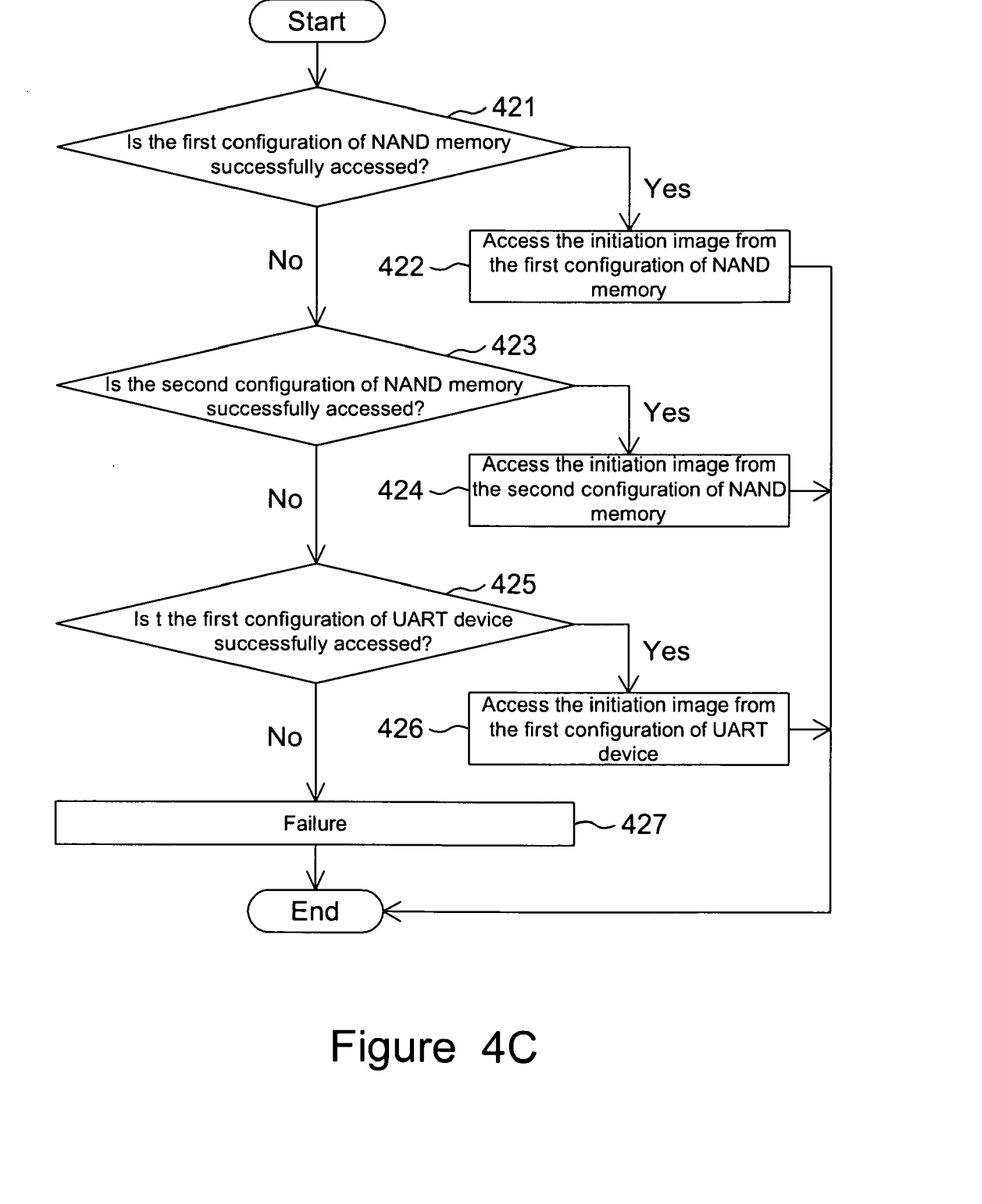
Figure 4D:
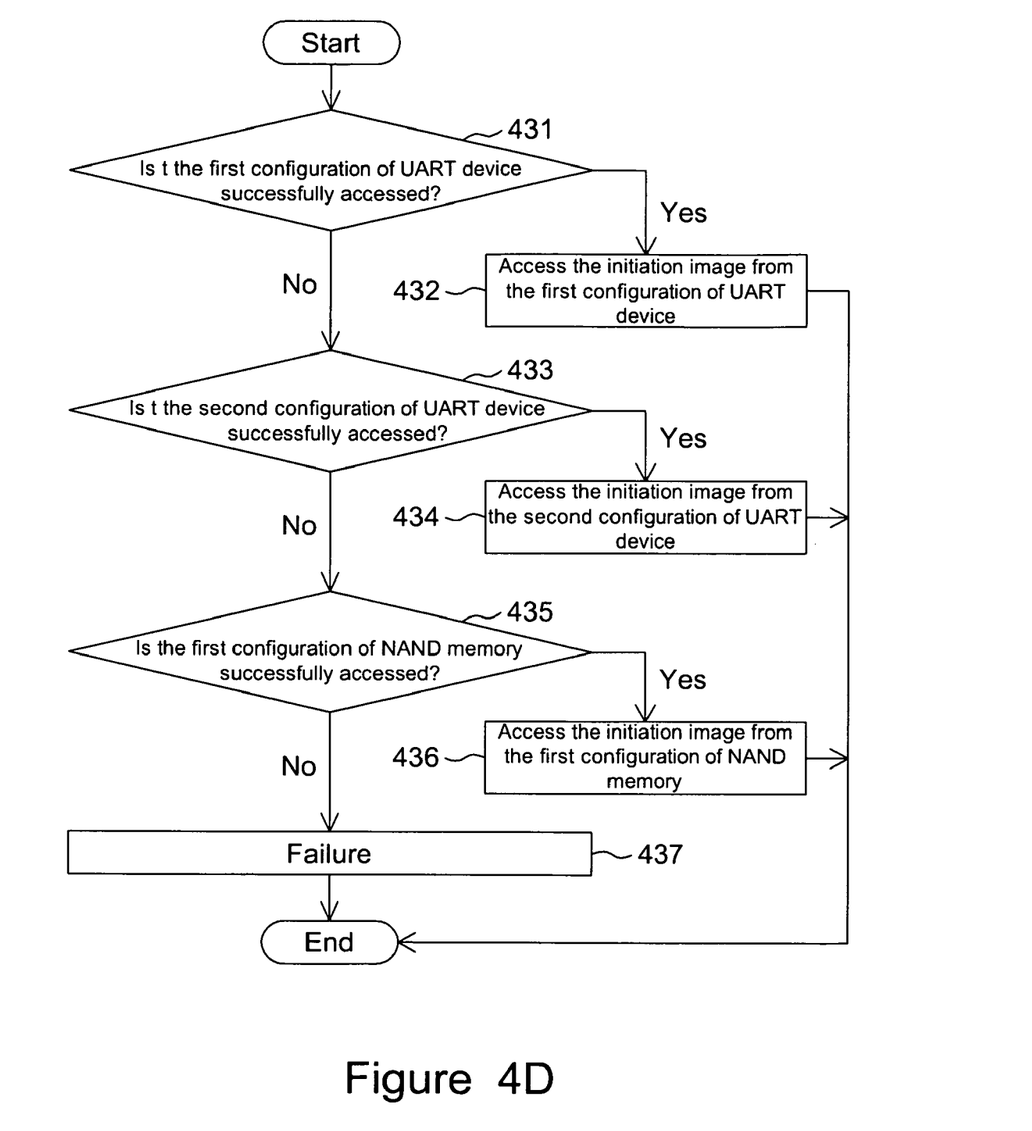

FIG. 4(a) to FIG. 4(d) illustrate various probable sequences of accessing initiation image source devices in accordance with an embodiment of the present invention. However, it shall not be construed as limiting. More specifically, when (B1, B2) are (0, 0), (0, 1), (1, 0), and (1, 1) respectively, the access sequence determined by the initiation image source device sequence tables are as illustrated in FIG. 4(a), FIG. 4(b), FIG. 4(c) and FIG. 4(d) respectively. In FIG. 4(a) and FIG. 4(b), the memory card (an SD card) is inserted into the memory card slot of the control interface, i.e., the bit B1 is "0". In FIG. 4(c) and FIG. 4(d), the memory card (an SD card) is not inserted into the memory card slot of the control interface, i.e., the bit B1 is "1". In FIG. 4(a) to FIG. 4(d), the initiation image source devices of the embedded electronic device comprise an SD card, a first and a second configuration of NAND memory, a first and a second configuration of UART device, and a USB device.

In FIG. 4(a), the access sequence determined by a first initiation image source device sequence table from a high priority to a low priority are the SD card, the first configuration of NAND memory and the first configuration of UART device. The sequence table is determined according to system requirements; that is, when the system requirements are changed, the sequence shall be changed. In this embodiment, the number of the initiation image source devices in a initiation image source device sequence table is not limited to three, which means the number can be increased or reduced according to the requirements.

The microprocessor tries to access the SD card for that the SD card has a highest priority as illustrated in Step 401. When the SD card is successfully accessed, Step 402 is executed. In Step 402, the microprocessor accesses the initiation image from the SD card to boot up the embedded electronic device. When the access fails, the microprocessor tries to access the first configuration of NAND memory having a second access sequence as illustrated in Step 403. Note that the above mentioned failure refers to a failure of the SD card or a circumstance that the SD card does not contain the initiation image needed for booting up the embedded electronic device.

If the first configuration of NAND memory is successfully accessed, the microprocessor accesses the initiation image from the first configuration of NAND memory as illustrated in Step 404 to boot up the embedded electronic device. Otherwise, the accessing fails, the microprocessor tries to access the first configuration of UART devices having a third accessing sequence as illustrated in Step 405.

When the first configuration of UART devices is successfully accessed, the microprocessor accesses the initiation image from the first configuration of UART devices as illustrated in Step 406 to boot up the embedded electronic device. The accessing fails, it means that booting of the embedded electronic device is failed as illustrated in Step 407.

In FIG. 4(b), the access sequence determined by a second initiation image source device sequence table from a high priority to a low priority are the SD card, the second configuration of NAND memory and the USB device.

Referring to FIG. 4(b), the microprocessor tries to access the SD card for that the SD card has a highest priority as illustrated in Step 411. When the SD card is successfully accessed, Step 412 is executed. In Step 412, the microprocessor accesses the initiation image from the SD card to boot up the embedded electronic device. When the access fails, the microprocessor tries to access the second configuration of NAND memory as illustrated in Step 413.

When the second configuration of NAND memory is successfully accessed, the microprocessor accesses the initiation image from the second configuration of NAND memory as illustrated in Step 414 to boot up the embedded electronic device. When the access fails, the microprocessor tries to access the USB device as illustrated in Step 415.

When the USB device is successfully accessed, the microprocessor accesses the initiation image from the USB device as illustrated in Step 416 to boot up the embedded electronic device. The access failure means that booting of the embedded electronic device is failed as illustrated in Step 417.

In FIG. 4(c), the access sequence determined by a third initiation image source device sequence table from a high priority to a low priority are the first configuration of NAND memory, the second configuration of NAND memory and the first configuration of UART device.

Referring to FIG. 4(c), the microprocessor tries to access the first configuration of NAND memory for that the NAND memory has a highest priority as illustrated in Step 421. When the first configuration of NAND memory is successfully accessed, Step 422 is executed. In Step 422, the microprocessor accesses the initiation image from the first configuration of NAND memory to boot up the embedded electronic device. When the access fails, the microprocessor tries to access the second configuration of NAND memory as illustrated in Step 423.

When the second configuration of NAND memory is successfully accessed, the microprocessor accesses the initiation image from the second configuration of NAND memory as illustrated in Step 424 to boot up the embedded electronic device. When the access fails, the microprocessor tries to access the first configuration of UART device as illustrated in Step 425.

When the first configuration of UART device is successfully accessed, the microprocessor accesses the initiation image from the first configuration of UART devices as illustrated in Step 426 to boot up the embedded electronic device. The access failure means that booting of the embedded electronic device is failed as illustrated in Step 427.

In FIG. 4(d), the access sequence determined by a fourth initiation image source device sequence table from a high priority to a low priority are the first configuration of UART devices, the second configuration of UART devices and the first configuration of NAND memory.

Referring to FIG. 4(d), the microprocessor tries to access the first configuration of UART device for that the UART device has a highest priority as illustrated in Step 431. When the first configuration of UART device is successfully accessed, Step 432 is executed. In Step 432, the microprocessor accesses the initiation image from the first configuration of UART devices to boot up the embedded electronic device. When the access fails, the microprocessor tries to access the second configuration of UART device as illustrated in Step 433.

When the second configuration of UART device is successfully accessed, the microprocessor accesses the initiation image from the second configuration of UART device as illustrated in Step 434 to boot up the embedded electronic device. When the access fails, the microprocessor tries to access the first configuration of NAND memory as illustrated in Step 435.

When the first configuration of NAND memory is successfully accessed, the microprocessor accesses the initiation image from the first configuration of NAND memory as illustrated in Step 436 to boot up the embedded electronic device. The access failure means that booting of the embedded electronic device is failed as illustrated in Step 437.

As mentioned above, according to the present invention, potential of the option pins are changed to select different initiation image source device sequence tables instead to determine the access sequence of initiation image source devices, so as to accomplish in providing a diversity of booting sequences. In addition, when the embedded electronic device has a wide selection of initiation image source devices, option pins are designed to respectively correspond to the initiation image source device sequence tables according to the present invention. Therefore, the number of option pins is reduced to decrease the volume and cost of the embedded electronic device.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An embedded electronic device, for downloading an initiation image from one of a plurality of initiation image source devices, comprising:
    a boot memory, for storing a boot code and a plurality of initiation image source sequence tables;
    a microprocessor, for executing the boot code and downloading the initiation image according to one of the initiation image source sequence tables;
    a register, for storing a status of an option pin; and
    a bus, coupled to the boot memory, the microprocessor, and the register, for transmitting data between the boot memory, the microprocessor, and the register;
    wherein the initiation image source sequence table is selected according to the status stored in the register, and the sequence of the initiation image source devices accessed by the microprocessor is determined according to the initiation image source sequence table.

2. The embedded electronic device as claimed in claim 1, further comprising:
    a RAM, coupled to the bus, for storing the initiation image downloaded by the microprocessor; and
    a control interface, coupled to the bus and the option pin;
    wherein the control interface determines a status of the option pin according to whether a first initiation image source device of the plurality of the initiation image source devices is coupled to the control interface.

3. The embedded electronic device as claimed in claim 2, wherein the microprocessor downloads the initiation image from the first initiation image source device, if the initiation image source device is found.

4. The embedded electronic device as claimed in claim 2, wherein the first initiation image source device is a flash card.

5. The embedded electronic device as claimed in claim 1, further comprising:
    a control interface, coupled to the bus and the optional pin;
    wherein the control interface determines a status of the option pin according to whether a first initiation image source device of the plurality of the initiation image source devices is coupled to the control interface, and the option pin is coupled to the register, for providing the status to the register.

6. The embedded electronic device as claimed in claim 1, wherein the initiation image source sequence table is used to select an initiation image source device by the microprocessor for downloading the initiation image.

7. An embedded electronic device, for downloading an initiation image from an initiation image source device, comprising:
    a boot memory, for storing a boot code;
    a microprocessor, for executing the boot code and downloading the initiation image from the initiation image source device;
    a register, for storing a status of an option pin;
    a control interface, connected to the option pin, for setting the status of the option pin according to whether the initiation image source device is coupled to the control interface; and
    a bus, coupled to the boot memory, the microprocessor, the register, and the control interface, for providing data transmission between the boot memory, the microprocessor, the register, and the control interface;
wherein the microprocessor downloads the initiation image from the initiation image source device when the initiation image source device is connected to the control interface.

8. A booting method for an embedded electronic device comprising a boot memory and a register storing a status of an option pin, the booting method comprising:
   executing a boot code stored in the boot memory;
   accessing the register;
   accessing an initiation image source sequence table according to the register; and
   downloading an initiation image from an initiation image source device according to the initiation image source sequence table;
   wherein the initiation image source sequence table is used to select the initiation image source device by the microprocessor for downloading the initiation image.

9. The booting method as claimed in claim 8, further comprising:
   storing the initiation image in a RAM.

10. The booting method as claimed in claim 8, wherein the initiation image source sequence table is used to determine a sequence of a plurality of initiation image source devices to be accessed.

11. The booting method as claimed in claim 10, wherein the step of downloading the initiation image comprising:
   downloading the initiation image from a first initiation image source device listed in the initiation image source sequence table; and
   if downloading from the first initiation image source device is failed, then downloading the initiation image from a second initiation image source device listed in the initiation image source sequence table.

* * * * *